United States Patent
Song (10) Patent No.: US 12,511,618 B2
(45) Date of Patent: Dec. 30, 2025

(54) INVENTORY INFORMATION PROCESSING METHOD AND DEVICE

(71) Applicant: BEIJING JINGDONG QIANSHI TECHNOLOGY CO., LTD., Beijing (CN)

(72) Inventor: Yafen Song, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 258 days.

(21) Appl. No.: 18/265,835

(22) PCT Filed: Dec. 21, 2021

(86) PCT No.: PCT/CN2021/140065
§ 371 (c)(1),
(2) Date: Jun. 7, 2023

(87) PCT Pub. No.: WO2022/148237
PCT Pub. Date: Jul. 14, 2022

(65) Prior Publication Data
US 2024/0054451 A1 Feb. 15, 2024

(30) Foreign Application Priority Data
Jan. 6, 2021 (CN) .......................... 202110014753.8

(51) Int. Cl.
*G06Q 10/087* (2023.01)
(52) U.S. Cl.
CPC ................... *G06Q 10/087* (2013.01)
(58) Field of Classification Search
CPC ........... G06Q 10/087; G06Q 10/06315; G06Q 10/10; G06F 8/65
(Continued)

(56) References Cited

U.S. PATENT DOCUMENTS 10,817,830 B1 * 10/2020 Dahlstrom ........... G06Q 10/087
2016/0055572 A1 * 2/2016 Chen .................. G06Q 30/0639
705/26.81
(Continued)

FOREIGN PATENT DOCUMENTS

CN 101493911 A 7/2009
CN 103426072 A 12/2013
(Continued)

OTHER PUBLICATIONS

English Translation of International Search Report and Written Opinion for Application No. PCT/CN2021/140065 dated Mar. 15, 2021 (8 pages).
(Continued)

*Primary Examiner* — Garcia Ade
(74) *Attorney, Agent, or Firm* — Michael Best & Friedrich LLP (57) ABSTRACT

The disclosure provides a method and apparatus for processing inventory information. The method comprises: receiving an inventory update request input by a user, wherein the request includes: any multiple pieces of information among a self-owned available inventory of the user, first virtual inventories provided by the user, and second virtual inventories acquired by the user; updating stored first inventory information by using the multiple pieces of information included in the inventory update request; reserving, if the inventory update request includes multiple ones of the first virtual inventories, the multiple ones of the first virtual inventories in the updated inventory information; and updating, if the inventory update request includes the self-owned available inventory and/or multiple ones of the second virtual inventories, second inventory information displayed on a page by using the self-owned available inventory and/or the multiple ones of the second virtual inventories.

17 Claims, 6 Drawing Sheets

(58) Field of Classification Search
USPC .......................................................... 705/28
See application file for complete search history.

(56) References Cited

U.S. PATENT DOCUMENTS

2017/0083854 A1    3/2017  Elyea et al.
2022/0092523 A1*   3/2022  Uchimura ............. G07F 11/004

FOREIGN PATENT DOCUMENTS

| CN | 105678609 | A | 6/2016 |
| CN | 106156975 | A | 11/2016 |
| CN | 106233255 | A | 12/2016 |
| CN | 106296052 | A | 1/2017 |
| CN | 106327114 | A | 1/2017 |
| CN | 107256470 | A | 10/2017 |
| CN | 108109018 | A | 6/2018 |
| CN | 108416656 | A | 8/2018 |
| CN | 110147974 | A | 8/2019 |
| CN | 110738436 | A | 1/2020 |
| CN | 110738445 | A | 1/2020 |
| CN | 111242555 | A | 6/2020 |
| CN | 111915259 | A | 11/2020 |
| CN | 112101860 | A | 12/2020 |
| CN | 113762865 | A | 12/2021 |
| WO | WO-2016172027 A1 * | | 10/2016 ............... G06F 8/65 |
| WO | 2018210062 A1 | | 11/2018 |

OTHER PUBLICATIONS

Japanese Patent Office Notice of Reasons for Refusal for Application No. 2023-534140 dated Jul. 29, 2024 (4 pages including English machine translation).

Chinese Patent Office Action for Application No. 202110014753.8 dated Jan. 15, 2024 (16 pages including machine English translation).

* cited by examiner

INVENTORY INFORMATION PROCESSING METHOD AND DEVICE

CROSS-REFERENCE TO RELATED APPLICATION(S)

This is a U.S. national stage entry of International Patent Application No. PCT/CN2021/140065, filed on Dec. 21, 2021, which claims priority to Chinese Patent Application No. 202110014753.8, filed on Jan. 6, 2021, the entire contents of each of which are fully incorporated herein by reference.

TECHNICAL FIELD

The disclosure relates to the technical field of computers, and in particular relates to a method and apparatus for processing inventory information.

BACKGROUND

For an e-commerce platform or a logistics information system, an inventory of a certain merchant recorded or managed thereby generally only belongs to the merchant. That is, orders generated for each merchant on a sales platform can only locate self-owned items, and then instructions are issued to a warehouse to remove the self-owned items from storage. If the merchant does not have a sufficient inventory, it can resort to shared inventories from other merchants. Thus, the e-commerce platform or the logistics information system should take shared inventories into consideration during processing of inventory information.

At present, the manner of processing inventory information of the e-commerce platform or the logistics information system mainly provides an ownership transfer of a shared inventory between two merchants. For example, if Merchant A (supplier) provides part of the inventory to Merchant B (user), the ownership of the part of the inventory provided by Merchant A (supplier) is transferred to Merchant B (user), and the inventory of Merchant A will be correspondingly decreased.

During the implementation of the disclosure, the inventor finds that there is at least the following problem in the prior art:

The existing manner of processing inventory information cannot achieve inventory sharing among a plurality of merchants.

SUMMARY

In view of this, the embodiment of the disclosure provides a method and apparatus for processing inventory information, and can achieve inventory sharing among a plurality of merchants.

In order to achieve the aforesaid object, according to one aspect of the embodiment of the disclosure, a method for processing inventory information is provided, the method comprising: receiving an inventory update request input by a first user, wherein the inventory update request includes: any multiple pieces of information among a self-owned available inventory of the first user, first virtual inventories provided by the first user to a plurality of second users, and second virtual inventories, which are provided by a plurality of third users, acquired by the first user; updating stored first inventory information of the first user by using the multiple pieces of information included in the inventory update request; locking, if the inventory update request includes multiple ones of the first virtual inventories, the multiple ones of the first virtual inventories in the updated first inventory information, so that the first user transfers rights to use the multiple ones of the first virtual inventories; and updating, if the inventory update request includes the self-owned available inventory of the first user and/or multiple ones of the second virtual inventories, second inventory information of the first user displayed on a page by using the self-owned available inventory of the first user and/or the multiple ones of the second virtual inventories.

Preferably, the method for processing inventory information further comprises:
determining, when the first user receives an order, an inventory type for an item included in the order; and
decreasing inventories for the first inventory information and the second inventory information of the first user, respectively in accordance with the inventory type of the item and the item quantity included in the order.

Preferably, the step of decreasing inventories for the first inventory information and the second inventory information of the first user comprises:
for a case where the inventory type of the item included in the order is the self-owned available inventory,
decreasing the self-owned available inventory of the item in the first inventory information and the displayed inventory of the item in the second inventory information, respectively in accordance with the item quantity included in the order.

Preferably, the step of decreasing inventories for the first inventory information and the second inventory information of the first user comprises:
for a case where the inventory type of the item included in the order is the second virtual inventory,
determining at least one target second virtual inventory for the item; and performing an inventory update on the at least one target second virtual inventory.

Preferably, the step of determining at least one target second virtual inventory for the item comprises:
determining, if the item corresponds to multiple ones of the second virtual inventories, the at least one target second virtual inventory from the multiple ones of the second virtual inventories in accordance with a preset virtual inventory priority policy.

Preferably, the step of performing an inventory update on the at least one target second virtual inventory comprises:
generating an ownership adjustment sheet for the at least one target second virtual inventory;
sending the ownership adjustment sheet to a warehouse management system, so that the warehouse management system transfers the ownership of the item from the second user corresponding to the target second virtual inventory to the first user in accordance with the ownership adjustment sheet; and
decreasing the at least one target second virtual inventory included in the first inventory information and the item quantity included in the second inventory information after receiving an indication of a successful ownership transfer sent by the warehouse management system.

Preferably, after receiving an indication of a successful ownership transfer sent by the warehouse management system, the method further comprises:
increasing the self-owned available inventory included in the first inventory information.

Preferably, after receiving an indication of a successful ownership transfer sent by the warehouse management system, the method further comprises:

generating a purchase order with respect to at least one second user for the first user in accordance with information on the ownership transfer processed by the warehouse management system, so that resources are exchanged between the first user and the second user based on the purchase order; and updating inventory information corresponding to the at least one second user in accordance with the purchase order with respect to the at least one second user.

Preferably, the method for processing inventory information further comprises:

performing reverse conversions on the first inventory information and the second inventory information when receiving a return request for the item in the order.

Preferably, the method for processing inventory information further comprises:

for a case where the item is from the second virtual inventory, sending an inventory reversal request to the warehouse management system, so that the warehouse management system reverses the ownership of the item; and performing the steps of performing reverse conversions on the first inventory information and the second inventory information when receiving an indication of a successful ownership reversal sent by the warehouse management system.

Preferably, the step of performing a reverse conversion on the first inventory information comprises:

decreasing the self-owned available inventory of the item in the first inventory information.

Preferably, the method for processing inventory further comprises:

performing an increasing operation on the second virtual inventory corresponding to the item in the first inventory information of the first user.

Preferably, the method for processing inventory information further comprises:

for a case where the first inventory information includes the first virtual inventory, updating the first virtual inventory included in the first inventory information when receiving an ownership adjustment result for the first virtual inventory sent by the warehouse management system.

According to a second aspect, the embodiment of the disclosure provides an apparatus for processing inventory information, the apparatus comprising:

a receiving unit for receiving an inventory update request input by a first user, wherein the inventory update request includes: any multiple pieces of information among a self-owned available inventory of the first user, first virtual inventories provided by the first user to a plurality of second users, and second virtual inventories, which are provided by a plurality of third users, acquired by the first user; and an inventory updating unit for updating stored first inventory information of the first user by using the multiple pieces of information included in the inventory update request; reserving, if the inventory update request includes multiple ones of the first virtual inventories, the multiple ones of the first virtual inventories in the updated first inventory information, so that the first user transfers rights to use the multiple ones of the first virtual inventories; and updating, if the inventory update request includes the self-owned available inventory of the first user and/or multiple ones of the second virtual inventories, second inventory information of the first user displayed on a page by using the self-owned available inventory of the first user and/or the multiple ones of the second virtual inventories.

Preferably, the inventory updating unit is further used for determining, when the first user receives an order, an inventory type for an item included in the order; and decreasing inventories for the first inventory information and the second inventory information of the first user, respectively in accordance with the inventory type of the item and the item quantity included in the order.

BRIEF DESCRIPTION OF THE DRAWINGS

FIGURES are used to better understand the disclosure, and do not form improper limitations of the disclosure. Where.

DETAILED DESCRIPTION

The exemplary embodiments of the disclosure, including various details of the embodiments of the disclosure, are described below in combination with the figures to facilitate understanding, and shall be considered to be exemplary ones only. Thus, those skilled in the art should recognize that various changes and modifications may be made to the embodiments described herein without departing from the scope and spirit of the disclosure. Similarly, for clarity and conciseness, descriptions of well-known functions and structures are omitted in the descriptions below.

The aforesaid one embodiment in the disclosure has the following advantages or beneficial effects: since storage, update, management and so on can be performed for multiple inventory types of a user, namely a self-owned available inventory of the user, first virtual inventories provided to a plurality of second users, and acquired second virtual inventories provided by a plurality of third users, when difficulties are encountered, for a case where the inventory update request includes multiple ones of the first virtual inventories, the multiple ones of the first virtual inventories in the updated first inventory information are reserved, so that the first user transfers rights to use the multiple ones of the first virtual inventories; and for a case where the inventory update request includes the self-owned available inventory of the first user and/or multiple ones of the second virtual inventories, second inventory information of the first user displayed on a page is updated by using the self-owned available inventory of the first user and/or the multiple ones of the second virtual inventories, and thanks to differentiated managements of the pieces of inventory information of different inventory types, inventories from different users/merchants and inventories provided to different users/merchants may be managed or processed in a differentiated manner, which allows a plurality of merchants to share inventories. Meanwhile, the inventory information can be processed more clearly and explicitly.

Further effects of the aforesaid non-conventional optional manners will be described below in combination with specific implementation modes.

In the embodiment of the disclosure, a first user, a second user, a third user, and the like generally refer to merchants on e-commerce platforms, wherein the wordings "first", "second" and "third" are used to distinguish different types of users, and are not used to specify the number of the users. In addition, the first virtual inventory and the second virtual inventory may be used to tell the different sources of the virtual inventories, and the wordings "first" and "second" are not used to specify the quantity of the virtual inventories. It is worth noting that the first user, the second user and the third user are relatively said, the second user may be converted into the first user and the third user, and the third user may also be converted into the first user and the second user. The first virtual inventory and the second virtual inventory are also relatively said, and the first virtual inventory of the first user may be the second virtual inventory of the second user. For example, Merchant A provides the first virtual inventories to Merchant B and Merchant C, respectively, and Merchant B provides the first virtual inventories to Merchant A and Merchant C, respectively, and correspondingly, Merchant A acquires the second virtual inventory provided by Merchant B, and Merchant C acquires the second virtual inventories provided by Merchant A and Merchant B. When Merchant A serves as the first user, Merchant B and Merchant C are the second users, and Merchant B is also the third user; when Merchant B serves as the first user, Merchant A and Merchant C are the second users, and Merchant A is also the third user; and when Merchant C serves as the first user, Merchant A and merchant B are the third users.

Figure 1:
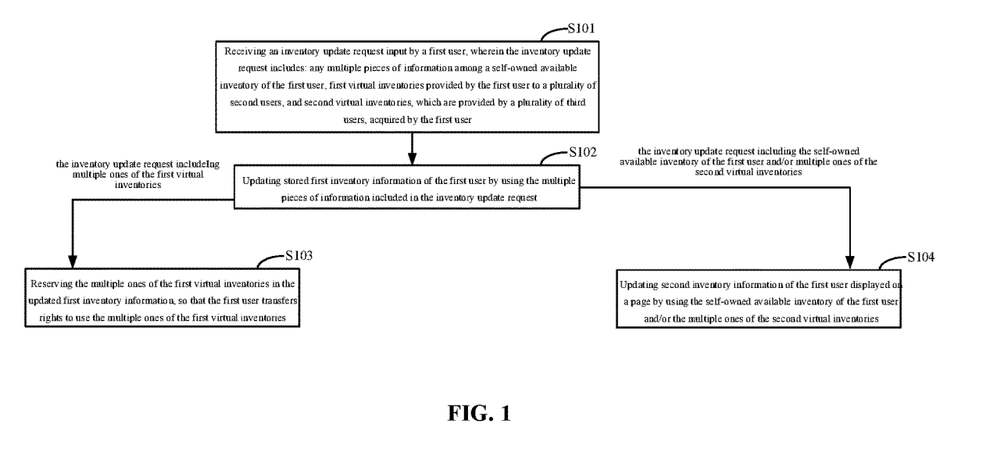
FIG. 1 is a schematic diagram of a main flow of a method for processing inventory information according to an embodiment of the disclosure.

FIG. 1 is a method for processing inventory information according to an embodiment of the disclosure. As shown in FIG. 1, the method for processing inventory information may comprise the following steps:

Step S101: receiving an inventory update request input by a first user, wherein the inventory update request includes: any multiple pieces of information among a self-owned available inventory of the first user, first virtual inventories provided by the first user to a plurality of second users, and second virtual inventories, which are provided by a plurality of third users, acquired by the first user;

Step S102: updating stored first inventory information of the first user by using the multiple pieces of information included in the inventory update request; performing step S103 if the inventory update request includes multiple ones of the first virtual inventories; and performing step S104 if the inventory update request includes the self-owned available inventory of the first user and/or multiple ones of the second virtual inventories;

Step 103: reserving the multiple ones of the first virtual inventories in the updated first inventory information, so that the first user transfers rights to use the multiple ones of the first virtual inventories, and ending the current flow; and Step S104: updating second inventory information of the first user displayed on a page by using the self-owned available inventory of the first user and/or the multiple ones of the second virtual inventories.

Wherein the self-owned available inventory generally refers to inventory information of items, which are stored in the warehouse by the first user, owned by the first user, and can be used by the first user, such as item type, item name, and item quantity.

The first virtual inventory refers to inventory information of items, which are stored in the warehouse by the first user and owned by the first user, and which are provided to the second user for use, so that the second user has the right to use the items, such as item type, item name, and item quantity.

The second virtual inventory refers to inventory information of items, which are stored in the warehouse by the third user and owned by the third user, and which are provided to the first user for use, so that the first user has the right to use the items, such as item type, item name, and item quantity.

The first inventory information is information that is managed inside the system and will not be displayed to purchasers.

The second inventory information is formation displayed to purchasers.

In the embodiment shown in FIG. 1, since storage, update, management and so on can be performed for multiple inventory types of a user, namely a self-owned available inventory of the user, first virtual inventories provided to a plurality of second users, and acquired second virtual inventories provided by a plurality of third users, when difficulties are encountered, for a case where the inventory update request includes multiple ones of the first virtual inventories, the multiple ones of the first virtual inventories in the updated first inventory information are reserved, so that the first user transfers rights to use the multiple ones of the first virtual inventories; and for a case where the inventory update request includes the self-owned available inventory of the first user and/or multiple ones of the second virtual inventories, second inventory information of the first user displayed on a page is updated by using the self-owned available inventory of the first user and/or the multiple ones of the second virtual inventories, and thanks to differentiated managements of the pieces of inventory information of different inventory types, inventories from different users/merchants and inventories provided to different users/merchants may be managed or processed in a differentiated manner, which allows a plurality of merchants to share inventories. Meanwhile, the inventory information can be processed more clearly and explicitly.

Figure 2:
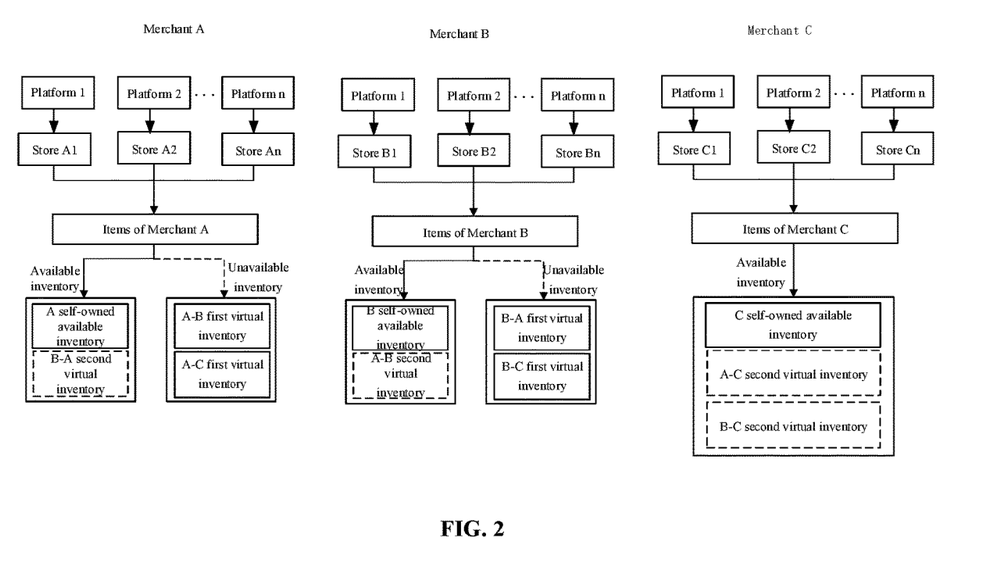
FIG. 2 is a schematic diagram of a partial structure of inventory information processing according to an embodiment of the disclosure.

The method for processing inventory information provided by the embodiment of the disclosure may manage the same merchant (user) on multiple platforms in a unified manner. A partial structure of an inventory information processing structure is exemplarily shown in FIG. 2 as follows:

1) Merchant A on the multiple platforms (Platform 1 to Platform n) reserves a part of inventories of some SKUs in the warehouse for Merchant B (if Merchant A serves as the first user, Merchant B is the second user relative to Merchant A; if Merchant B serves as the first user, Merchant A is the third user relative to Merchant B) (A-B first virtual inventory corresponding to Merchant A and A-B second virtual inventory corresponding to Merchant B as shown in FIG. 2), meanwhile Merchant B (Merchant A serves as the first user, Merchant B is also the third user relative to Merchant A; if Merchant B serves as the first user, Merchant A is also the second user relative to Merchant B) also reserves a part of inventories of some other SKUs in the warehouse for Merchant A <that is, Merchant A acquires a part of inventories of some other SKUs from Merchant B> (B-A second virtual inventory corresponding to Merchant A and B-A first virtual inventory corresponding to Merchant B as shown in FIG. 2), and Merchant A and Merchant B may be suppliers with respect to each other;
2) While Merchant A provides SKUs to Merchant B, it may also reserve inventories of some SKUs for Merchant C (A-C first virtual inventory corresponding to Merchant A and A-C second virtual inventory corresponding to Merchant C as shown in FIG. 2) to provide virtual inventories to Merchant C;
3) While Merchant B and Merchant A are suppliers with respect to each other, Merchant B may still reserve inventories of some SKUs for Merchant C (B-C first virtual inventory corresponding to Merchant B and B-C second virtual inventory corresponding to Merchant C as shown in FIG. 2), and serves as the supplier with respect to Merchant C;
4) Merchant C uses the inventories (A-C second virtual inventory and B-C second virtual inventory) virtually reserved by Merchant A and Merchant B therefor; and
5) Merchant A, Merchant B and Merchant C all have their self-owned available inventories (A self-owned available inventory, B self-owned available inventory, and C self-owned available inventory as shown in FIG. 2).

Where the B-A second virtual inventory of Merchant A is from the B-A first virtual inventory of merchant B; the A-B second virtual inventory of Merchant B is from the A-B first virtual inventory of Merchant A; the A-C second virtual inventory of Merchant C is from the A-C first virtual inventory of Merchant A; and the B-C second virtual inventory of Merchant C is from the B-C first virtual inventory of Merchant B.

To sum up, by means of such inventory information processing structure, a certain quantity of the first virtual inventories of any merchant may be reserved for use by another merchant in the system, the same merchant may serve as a supplier and a user at the same time, or serve as a supplier or a user only, which allows a plurality of merchants to share the inventories in a crossed manner, thereby forming a many-to-many in-depth inventory sharing relationship between the suppliers and the users.

In the embodiment of the disclosure, the aforesaid method for processing inventory information may further comprise: determining, when the first user receives an order, an inventory type for an item included in the order; and decreasing inventories for the first inventory information and the second inventory information of the first user, respectively in accordance with the inventory type of the item and the item quantity included in the order. Where the inventory type may be any one of the self-owned available inventory, the first virtual inventory and the second virtual inventory. Since the first virtual inventory is reserved, it cannot be removed from storage.

The specific implementation mode of decreasing inventories for the first inventory information and the second inventory information of the first user may comprise: for a case where the inventory type of the item included in the order is the self-owned available inventory, decreasing the self-owned available inventory of the item in the first inventory information and the displayed inventory of the item in the second inventory information, respectively in accordance with the item quantity included in the order.

For example, if a purchaser places an order for an item 1 from Merchant A, and the item 1 is from the self-owned available inventory of Merchant A, the quantity of the items 1 purchased by the purchaser may be deducted from the self-owned available inventory of Merchant A.

The specific implementation mode of decreasing inventories for the first inventory information and the second inventory information of the first user may further comprise: for a case where the inventory type of the item included in the order is the second virtual inventory, determining at least one target second virtual inventory for the item; and performing an inventory update on the at least one target second virtual inventory.

By means of the aforesaid separate processings and managements with respect to different inventory types, the inventories may be managed in a targeted manner, which makes the inventory management be more accurate and efficient.

In the embodiment of the disclosure, the aforesaid specific implementation mode of determining at least one target second virtual inventory for the item may comprise: determining, if the item corresponds to multiple ones of the second virtual inventories, the at least one target second virtual inventory from the multiple ones of the second virtual inventories in accordance with a preset virtual inventory priority policy. The virtual inventory priority policy may be correspondingly set according to user requirements, for example, the selection sequence of the multiple ones of the second virtual inventories, the selection ratio of the multiple ones of the second virtual inventories, and the like.

For example, the item 1 in Merchant A is mainly from the second virtual inventory acquired by Merchant A from Merchant B, the second virtual inventory acquired by Merchant A from Merchant D, and the second virtual inventory acquired by Merchant A from Merchant E, and the priority policy is to preferentially select the second virtual inventory acquired by Merchant A from Merchant B, then select the second virtual inventory acquired by Merchant A from Merchant D, and finally select the second virtual inventory acquired by Merchant A from Merchant E. According to this priority policy, the second virtual inventory acquired by Merchant A from Merchant B is preferentially selected for the item 1 in the order received by Merchant A.

Since one item may be from multiple ones of the second virtual inventories, a selection of the managed second virtual inventories may be achieved by this method, so as to effectively reduce manual participation in management.

Figure 3:
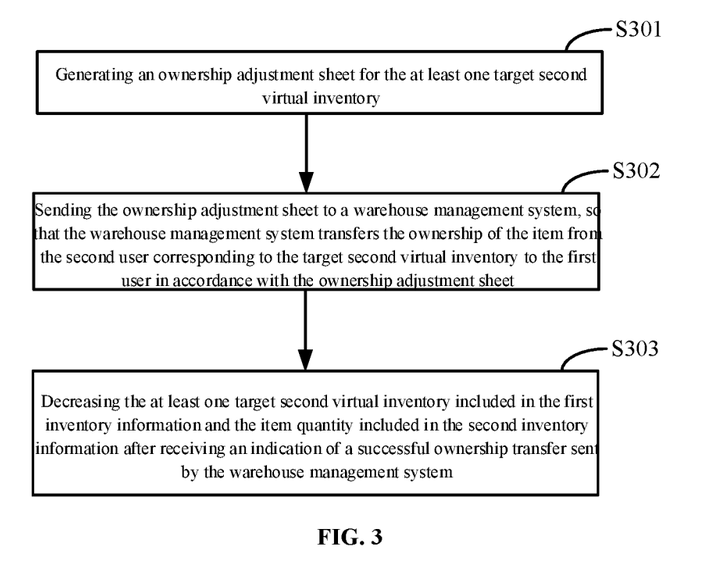
FIG. 3 is a schematic diagram of a main flow of performing an inventory update on at least one target second virtual inventory according to an embodiment of the disclosure.

In the embodiment of the disclosure, as shown in FIG. 3, the specific implementation mode of performing an inventory update on the at least one target second virtual inventory may comprise the following steps:

Step S301: generating an ownership adjustment sheet for the at least one target second virtual inventory; The ownership adjustment sheet mainly includes transferring the ownership of the item belonging to the target second virtual inventory in the order from the supplier (second user) of the target second virtual inventory to the recipient (first user) of the target second virtual inventory; for example, if the item 1 in the order received by Merchant A belongs to the second virtual inventory provided by Merchant B to Merchant A, the ownership adjustment sheet includes transferring the ownership of the item 1 in the order from Merchant B to Merchant A; in addition, the ownership adjustment sheet further includes the quantity of the items the ownership of which is transferred, for example, if the quantity of the items 1 in the order is 4, the quantity of the items 1 the ownership of which is required to be transferred is 4 correspondingly;

Step S302: sending the ownership adjustment sheet to a warehouse management system, so that the warehouse management system transfers the ownership of the item from the second user corresponding to the target second virtual inventory to the first user in accordance with the ownership adjustment sheet;

Step S303: decreasing the at least one target second virtual inventory included in the first inventory information and the item quantity included in the second inventory information after receiving an indication of a successful ownership transfer sent by the warehouse management system.

By means of the aforesaid process, the transfer of the ownership of the item of a shared inventory in the order is achieved, so that the inventory management is more standardized, and the actual inventories, sales and other pieces of information of the respective merchants can be recorded in a comparatively good manner. Meanwhile, by means of the aforesaid ownership transfer, the circulation process of the item can be better managed, so as to better trace the source of the item.

In the embodiment of the disclosure, after receiving an indication of a successful ownership transfer sent by the warehouse management system, the method may further comprise: increasing the self-owned available inventory included in the first inventory information.

For example, if the item 1 in the order received by Merchant A belongs to the second virtual inventory provided by Merchant B to Merchant A, the ownership of the item 1 in the order is transferred from Merchant B to Merchant A by the warehouse management system, and the self-owned available inventory of Merchant A should be correspondingly increased. Correspondingly, the second virtual inventory provided by Merchant B to Merchant A should be decreased.

By means of this process, the circulation of the inventory is further truly recorded, and meanwhile the increase or decrease of the self-owned available inventory can be truly recorded, so as to provide better information records or evidence for item traceability.

Figure 4:
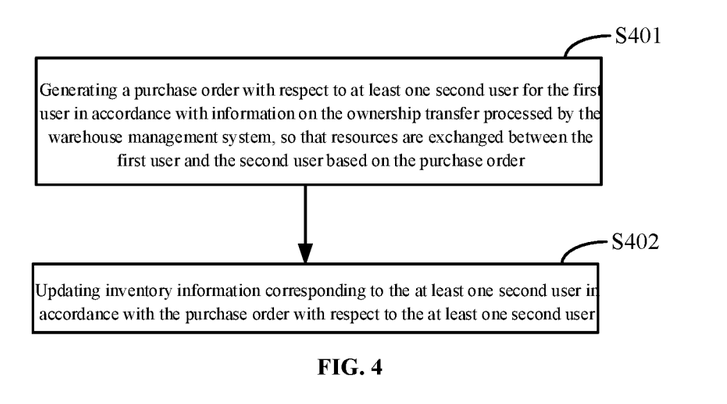
FIG. 4 is a schematic diagram of a main flow of updating inventory information corresponding to at least one second user according to an embodiment of the disclosure.

In the embodiment of the disclosure, as shown in FIG. 4, after receiving an indication of a successful ownership transfer sent by the warehouse management system, the method may further comprise the following steps:

Step S401: generating a purchase order with respect to at least one second user for the first user in accordance with information on the ownership transfer processed by the warehouse management system, so that resources are exchanged between the first user and the second user based on the purchase order;

The resource exchange means that the first user obtains some of the items stored in the warehouse by the second user, and the first user pays the second user an amount of money or other resources matching some of the items; and Step S402: updating inventory information corresponding to the at least one second user in accordance with the purchase order with respect to the at least one second user.

By means of the aforesaid process, the first user and the second user are enabled to conduct transactions based on the purchase order, and meanwhile by means of the aforesaid process, the unified management of the multi-purpose inventories with inventory sharing is achieved, so as to achieve synchronization, unification and accuracy of the inventory management.

In the embodiment of the disclosure, the method for processing inventory information may further comprise: performing reverse conversions on the first inventory information and the second inventory information when receiving a return request for the item in the order. The process achieves a reverse management of the inventory. That is, when Merchant A receives a return order, and the item in the return order is from the second virtual inventory provided by Merchant B to Merchant A, the item in the return order may be returned to Merchant B by means of a reverse conversion, which prevents Merchant A from hoarding a large quantity of items due to the return orders, so the embodiment of the disclosure can effectively further satisfy the requirements of the respective merchants by means of the reverse conversions.

Figure 5:
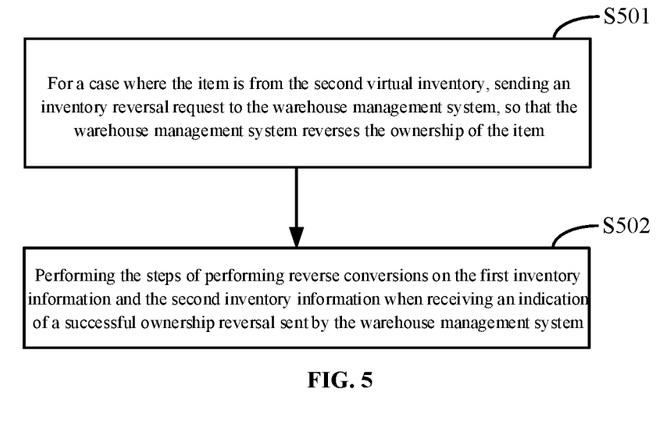
FIG. 5 is a schematic diagram of a main flow of a method for processing inventory information according to another embodiment of the disclosure.

In the embodiment of the disclosure, as shown in FIG. 5, the method for processing inventory information may further comprise the following steps:

Step S501: for a case where the item is from the second virtual inventory, sending an inventory reversal request to the warehouse management system, so that the warehouse management system reverses the ownership of the item; and Step S502: performing the steps of performing reverse conversions on the first inventory information and the second inventory information when receiving an indication of a successful ownership reversal sent by the warehouse management system.

By means of this process, the ownership transfer of the item in the return order is achieved, the circulation of the item is further recorded, and meanwhile the inventory states and inventory sources of the respective merchants or users can be clearly recorded. During subsequent inventory planning, these pieces of information may be referred to by the merchants or users for the adjustment of the self-owned available inventories, the first virtual inventories and the second virtual inventories.

In the embodiment of the disclosure, for a case where the item is returned and the item is from the second virtual inventory, the step of performing a reverse conversion on the first inventory information may comprise: decreasing the self-owned available inventory of the item in the first inventory information. By means of this process, the inventories of the respective merchants can be truly reflected.

In the embodiment of the disclosure, the method for processing inventory information may further comprise: performing an increasing operation on the second virtual inventory corresponding to the item in the first inventory information of the first user.

In the embodiment of the disclosure, the method for processing inventory information may further comprise: for a case where the first inventory information includes the first virtual inventory, updating the first virtual inventory included in the first inventory information when receiving an ownership adjustment result for the first virtual inventory sent by the warehouse management system.

Figure 6:
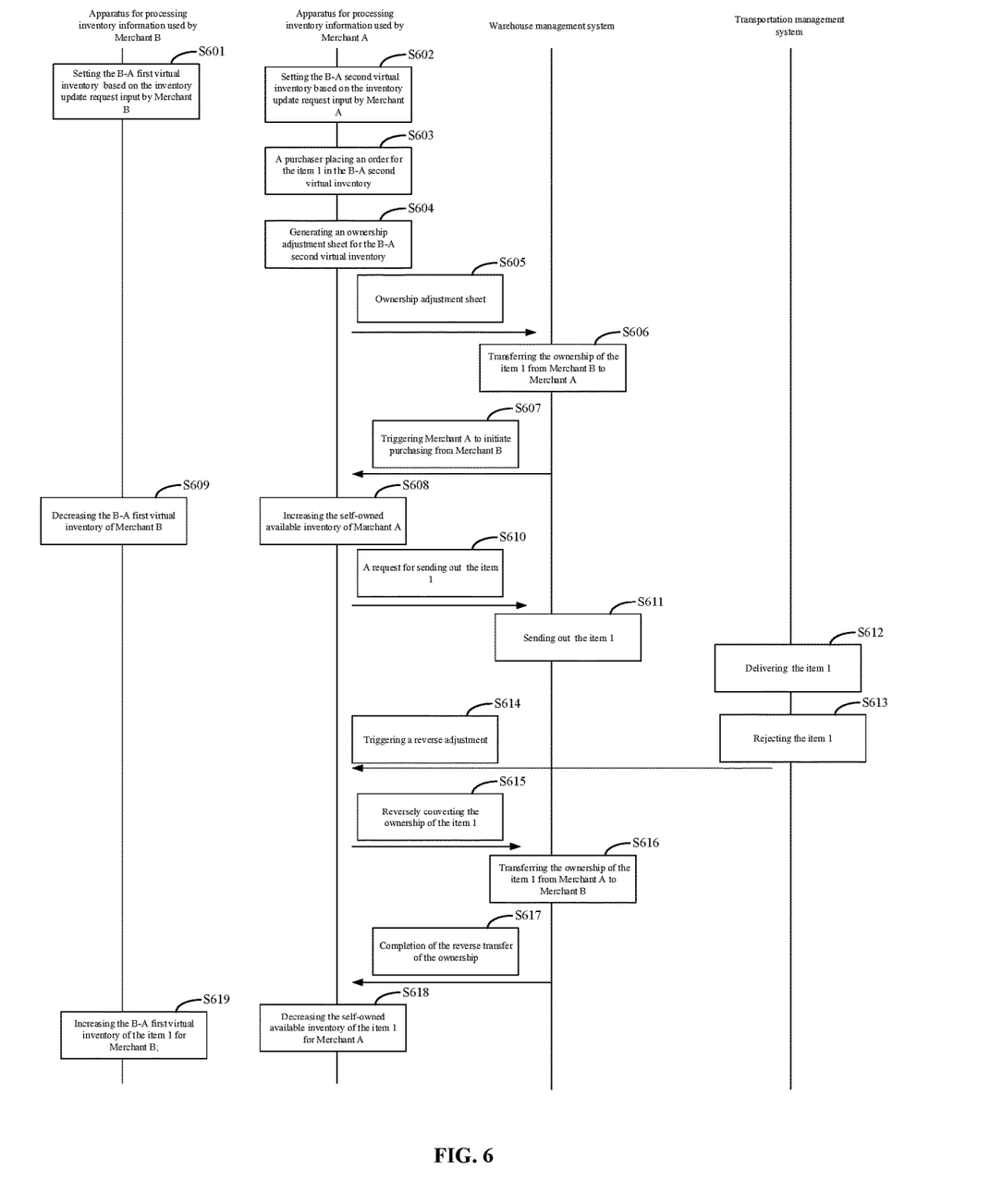
FIG. 6 is a schematic diagram of a main flow of a method for processing inventory information according to a further embodiment of the disclosure.

By taking it as an example that Merchant B provides the second virtual inventory of the item 1 to Merchant A, the purchaser places an order for the item 1 from Merchant A, the purchased item 1 is from the second virtual inventory provided by Merchant B to Merchant A, the purchaser subsequently rejects the item 1 after receiving it, and the item 1 is required to be returned, expanded explanations on how the method for processing inventory information provided by the embodiment of the disclosure achieves the management of the inventory information in combination with a warehouse management system and a transportation management system are given. As shown in FIG. 6, the inventory information processing may comprise the following steps:

Step S601: the apparatus for processing inventory information setting the B-A first virtual inventory for Merchant B based on the inventory update request input by Merchant B;

Step S602: the apparatus for processing inventory information setting the B-A second virtual inventory for Merchant A based on the inventory update request input by Merchant A;

wherein, there is no strict sequence between step S601 and step S602, and the two steps may be synchronously completed;

Step S603: the apparatus for processing inventory information receiving an order for the item 1 in the B-A second virtual inventory in Merchant A from a purchaser;

Step S604: the apparatus for processing inventory information generating an ownership adjustment sheet for the B-A second virtual inventory in Merchant A;

Step S605: the apparatus for processing inventory information sending the ownership adjustment sheet of Merchant A to the warehouse management system;

Step S606: the warehouse management system transferring the ownership of the item 1 from Merchant B to Merchant A;

Step S607: the warehouse management system triggering the apparatus for processing inventory information to execute initiation of purchasing from Merchant B by Merchant A;

Step S608: the apparatus for processing inventory information increasing the self-owned available inventory of Marchant A;

Step S609: the apparatus for processing inventory information decreasing the B-A first virtual inventory of Merchant B;

wherein there is no strict sequence between step S608 and step S609, and the two steps may be synchronously completed;

Step S610: Merchant A sending a request for sending out the item 1 by the apparatus for processing inventory information;

Step S611: the warehouse management system sending out the item 1;

Step S612: the transportation management system delivering the item 1;

Step S613: the transportation management system receiving a return order for the item 1;

Step S614: the transportation management system triggering the apparatus for processing inventory information to make a reverse adjustment;

Step S615: the apparatus for processing inventory information reversely converting the ownership of the item 1, and triggering the warehouse management system;

Step S616: the warehouse management system transferring the ownership of the item 1 from Merchant A to Merchant B after receiving the trigger, Step S617: the warehouse management system indicating the completion of the reverse transfer of the ownership;

Step S618: the apparatus for processing inventory information decreasing the self-owned available inventory of the item 1 for Merchant A; and Step S619: the apparatus for processing inventory information increasing the B-A first virtual inventory of the item 1 for Merchant B;

wherein there is no strict sequence between step S618 and step S619, and the two steps may be synchronously completed.

Figure 7:
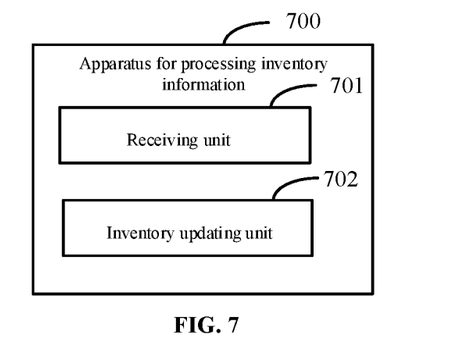
FIG. 7 is a schematic diagram of main units of an apparatus for processing inventory information according to an embodiment of the disclosure.

As shown in FIG. 7, the embodiment of the disclosure provides an apparatus for processing inventory information 700, which may comprise:

a receiving unit 701 for receiving an inventory update request input by a first user, wherein the inventory update request includes: any multiple pieces of information among a self-owned available inventory of the first user, first virtual inventories provided by the first user to a plurality of second users, and second virtual inventories, which are provided by a plurality of third users, acquired by the first user;

an inventory updating unit 702 for updating stored first inventory information of the first user by using the multiple pieces of information included in the inventory update request; reserving, if the inventory update request includes multiple ones of the first virtual inventories, the multiple ones of the first virtual inventories in the updated first inventory information, so that the first user transfers rights to use the multiple ones of the first virtual inventories; and updating, if the inventory update request includes the self-owned available inventory of the first user and/or multiple ones of the second virtual inventories, second inventory information of the first user displayed on a page by using the self-owned available inventory of the first user and/or the multiple ones of the second virtual inventories.

In the embodiment of the disclosure, the inventory updating unit 702 is further used for determining, when the first user receives an order, an inventory type for an item included in the order; and decreasing inventories for the first inventory information and the second inventory information of the first user, respectively in accordance with the inventory type of the item and the item quantity included in the order.

In the embodiment of the disclosure, the inventory updating unit 702 is used for, for a case where the inventory type of the item included in the order is the self-owned available inventory, decreasing the self-owned available inventory of the item in the first inventory information and the displayed inventory of the item in the second inventory information, respectively in accordance with the item quantity included in the order.

In the embodiment of the disclosure, the inventory updating unit 702 is used for, for a case where the inventory type of the item included in the order is the second virtual inventory, determining at least one target second virtual inventory for the item; and performing an inventory update on the at least one target second virtual inventory.

In the embodiment of the disclosure, the inventory updating unit 702 is used for determining, if the item corresponds to multiple ones of the second virtual inventories, the at least one target second virtual inventory from the multiple ones of the second virtual inventories in accordance with a preset virtual inventory priority policy.

In the embodiment of the disclosure, the inventory updating unit 702 is used for generating an ownership adjustment sheet for the at least one target second virtual inventory; sending the ownership adjustment sheet to a warehouse management system, so that the warehouse management system transfers the ownership of the item from the second user corresponding to the target second virtual inventory to the first user in accordance with the ownership adjustment sheet; and decreasing the at least one target second virtual inventory included in the first inventory information and the item quantity included in the second inventory information after receiving an indication of a successful ownership transfer sent by the warehouse management system.

In the embodiment of the disclosure, the inventory updating unit 702 is used for increasing the self-owned available inventory included in the first inventory information.

In the embodiment of the disclosure, the inventory updating unit 702 is used for generating a purchase order with respect to at least one second user for the first user in accordance with information on the ownership transfer processed by the warehouse management system, so that resources are exchanged between the first user and the second user based on the purchase order; and updating inventory information corresponding to the at least one second user in accordance with the purchase order with respect to the at least one second user.

In the embodiment of the disclosure, the receiving unit 701 is further used for receiving a return request for the item in the order, and sending the return request for the item in the order to the inventory updating unit 702.

The inventory updating unit 702 is used for performing reverse conversions on the first inventory information and the second inventory information in accordance with the received return request for the item in the order.

In the embodiment of the disclosure, the inventory updating unit 702 is used for, for a case where the item is from the second virtual inventory, sending an inventory reversal request to the warehouse management system, so that the warehouse management system reverses the ownership of the item; and performing the steps of performing reverse conversions on the first inventory information and the second inventory information when receiving an indication of a successful ownership reversal sent by the warehouse management system.

In the embodiment of the disclosure, the inventory updating unit 702 is used for decreasing the self-owned available inventory of the item in the first inventory information; and increasing the self-owned available inventory of the item in the inventory information of the second user.

In the embodiment of the disclosure, the inventory updating unit 702 is used for performing an increasing operation on the second virtual inventory corresponding to the item in the first inventory information of the first user.

In the embodiment of the disclosure, the inventory updating unit 702 is used for, for a case where the first inventory information includes the first virtual inventory, updating the first virtual inventory included in the first inventory information when receiving an ownership adjustment result for the first virtual inventory sent by the warehouse management system.

Figure 8:
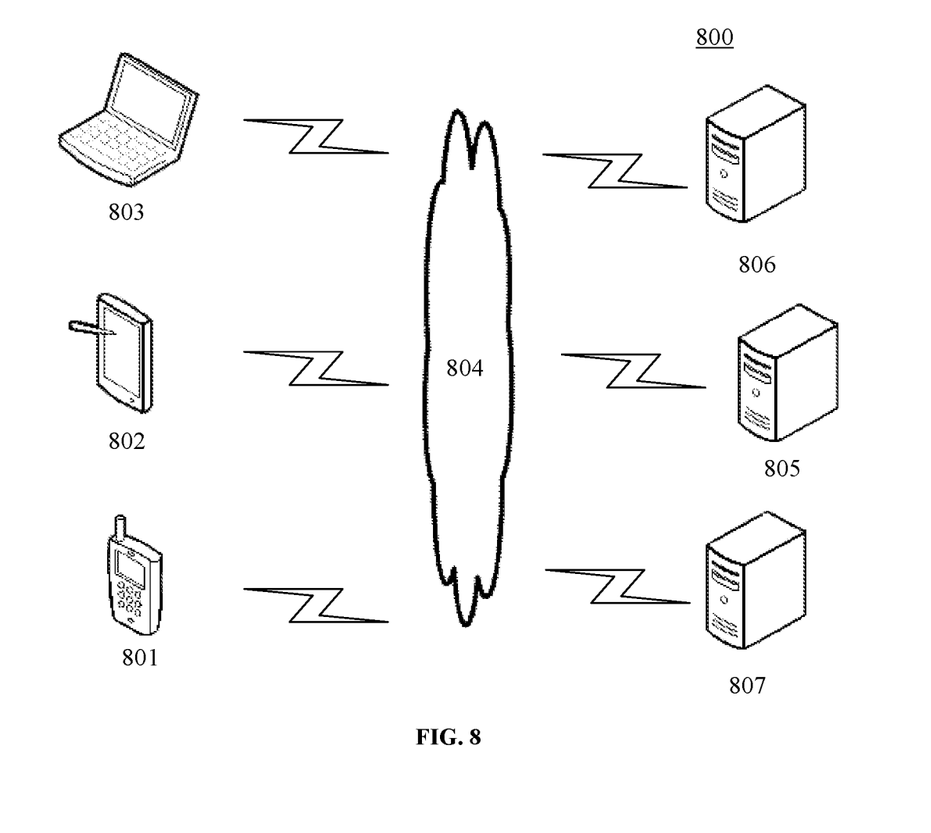
FIG. 8 is an exemplary diagram of a system architecture to which an embodiment of the disclosure can be applied.

FIG. 8 shows an exemplary system architecture 800 to which a method for processing inventory information or an apparatus for processing inventory information according to an embodiment of the disclosure can be applied.

As shown in FIG. 8, the system architecture 800 may comprise terminal devices 801, 802 and 803, a network 804, an inventory information processing server 805 having an inventory information processing system, a warehouse management server 806 equipped with a warehouse management system, and a transportation management server 807. The network 804 is a medium for providing a communication link between the terminal devices 801, 802 and 803 and the inventory information processing server 805, between the inventory information processing server 805 and the warehouse management server 806, between the inventory information processing server 805 and the transportation management server 807, and between the warehouse management server 806 and the transportation management server 807. The network 804 may include various connection types, such as wired or wireless communication links, or fiber-optic cables.

The user may use the terminal devices 801, 802 and 803 to interact with the inventory information processing server 805 through the network 804 to receive or send messages and so on. Various communication client applications, such as shopping applications, web browser applications, search applications, instant messaging tools, email clients, social platform software, and so on (only examples), may be installed on the terminal devices 801, 802 and 803.

The terminal devices 801, 802 and 803 may be various electronic devices having screens and supporting web browsing, including but not limited to smart phones, tablet computers, laptop portable computers, desktop computers, and so on.

The inventory information processing server 805 may be a server that provides an inventory management service, such as an inventory management server that provides support for shopping websites browsed by the user using the terminal devices 801, 802 and 803 (only an example). The inventory management server may process, for example, analyze the received inventory update request and other data, and feed the processing results (such as second inventory information displayed on a page—only an example) back to the terminal devices.

The warehouse management server 806 may be a server that provides an ownership transfer service of items in a warehouse, such as a sever that processes an ownership adjustment sheet sent by the inventory information processing server 805 (only an example). The warehouse management server may process, for example, analyze the received ownership adjustment sheet and other data, and feed the processing results (such as a result upon the completion of the ownership adjustment—only an example) back to the inventory information processing server 805.

The transportation management server 807 may be a server that provides a transportation management service for items in a warehouse, such as a server that processes an indication for item transportation sent by the warehouse management server 806, and may also send return information to the inventory information processing server 805 (only an example). The transportation management server 807 may process, for example, analyze the received order to be transported, return order and other data, and feed the processing results (such as a result that the returned item has been returned to the warehouse—only an example) back to the inventory information processing server 805.

It shall be noted that the method for processing inventory information provided by the embodiment of the disclosure is generally performed by the inventory information processing server 805, and correspondingly, the apparatus for processing inventory information is generally provided in the inventory information processing server 805.

It should be understood that the numbers of the terminal devices, the networks, the inventory information processing servers, the warehouse management servers and the transportation management servers are merely schematic. According to implementation requirements, there may be any numbers of terminal devices, networks, inventory information processing servers, warehouse management servers and transportation management servers.

Figure 9:
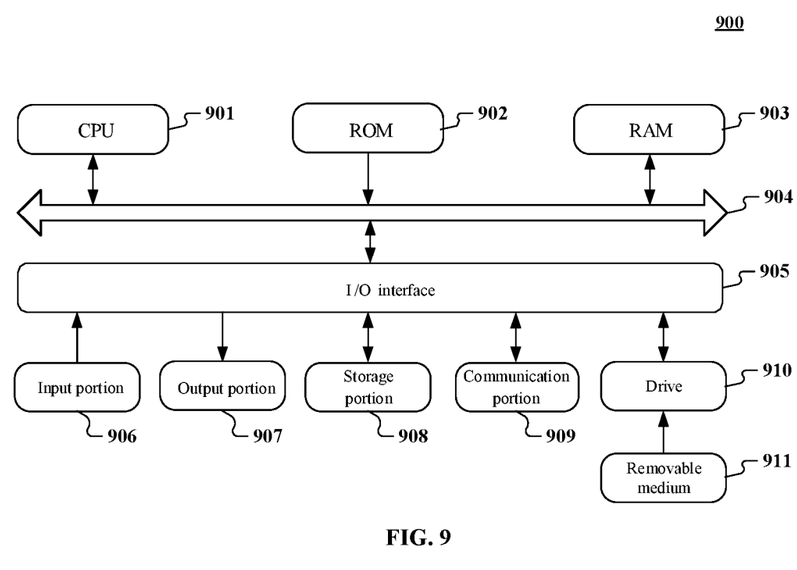
FIG. 9 is a schematic diagram of a structure of a computer system suitable for implementing a server according to an embodiment of the disclosure.

Reference is now made to FIG. 9, which shows a schematic diagram of a structure of a computer system 900 suitable for implementing a terminal device according to an embodiment of the disclosure. The inventory information processing server shown in FIG. 9 is only an example, and shall not impose any limitation on the functions and the scope of use of the embodiment of the disclosure.

As shown in FIG. 9, the computer system 900 includes a central processing unit (CPU) 901, which may perform various appropriate actions and processes according to a program stored in a read-only memory (ROM) 902 or a program loaded from a storage portion 908 into a random access memory (RAM) 903. Various programs and data required for the operation of the system 900 are also stored in the RAM 903. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse, and so on; an output portion 907 including a cathode ray tube (CRT), a liquid crystal display (LCD) and so on, and a speaker and so on; a storage portion 908 including a hard disk and so on; and a communication portion 909 including a network interface card such as a LAN card, a modem, and so on. The communication portion 909 performs communication processing via a network such as the Internet. A drive 910 is also connected to the I/O interface 905 according to requirements. A removable medium 911, such as a magnetic disk, an optical disk, a magneto-optical disk, a semiconductor memory, and so on, is installed on the drive 910 according to requirements so that a computer program read therefrom is installed in the storage portion 908 according to requirements.

In particular, according to the embodiment of the disclosure, the process described above with reference to the flowchart may be implemented as a computer software program. For example, the embodiment of the disclosure includes a computer program product, which includes a computer program carried on a computer-readable medium, the computer program containing a program code for performing the method shown in the flowchart. In such embodiment, the computer program may be downloaded and installed from the network through the communication portion 909, and/or installed from the removable medium 911. When the computer program is executed by the central processing unit (CPU) 901, the aforesaid functions defined in the system according to the disclosure are executed.

It shall be noted that the computer-readable medium shown in the disclosure may be a computer-readable signal medium or a computer-readable storage medium or any combination of the aforesaid two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the disclosure, the computer-readable storage medium may be any tangible medium containing or storing a program, and the program may be used by or in combination with an instruction execution system, apparatus or device. In the disclosure, the computer-readable signal medium may include a data signal propagated in a baseband or propagated as a part of a carrier wave, in which a computer-readable program code is carried. Such propagated data signal may adopt many forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program for use by or in connection with the instruction execution system, apparatus or device. The program code contained on the computer-readable medium may be transmitted using any appropriate medium, including but not limited to wireless, wire, optical cable, RF, and so on, or any suitable combination thereof.

The flowcharts and block diagrams in the figures illustrate architectures, functions and operations that may be implemented by systems, methods and computer program products according to various embodiments of the disclosure. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may also occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved units described in the embodiment of the disclosure may be implemented by software or hardware. The described units may be also provided in a processor. For example, a description may be made as follows: a processor comprising a receiving unit and an inventory updating unit. The names of these units do not form limitations of the units themselves in some cases. For example, the receiving unit may be also described as a "unit for receiving an inventory update request input by a first user".

As another aspect, the disclosure also provides a computer-readable medium, which may be included in the devices described in the aforesaid embodiment, or may exist independently without being assembled into the devices. The aforesaid computer-readable medium carries one or more programs, and the one or more programs, when executed by one of the devices, cause the device to include:
   receiving an inventory update request input by a first user, wherein the inventory update request includes: any multiple pieces of information among a self-owned available inventory of the first user, first virtual inventories provided by the first user to a plurality of second users, and second virtual inventories, which are provided by a plurality of third users, acquired by the first user;

updating stored first inventory information of the first user by using the multiple pieces of information included in the inventory update request; reserving, if the inventory update request includes multiple ones of the first virtual inventories, the multiple ones of the first virtual inventories in the updated first inventory information, so that the first user transfers rights to use the multiple ones of the first virtual inventories; and updating, if the inventory update request includes the self-owned available inventory of the first user and/or multiple ones of the second virtual inventories, second inventory information of the first user displayed on a page by using the self-owned available inventory of the first user and/or the multiple ones of the second virtual inventories.

According to the technical solution of the embodiment of the disclosure, since storage, update, management and so on can be performed for multiple inventory types of a user, namely a self-owned available inventory of the user, first virtual inventories provided to a plurality of second users, and acquired second virtual inventories provided by a plurality of third users, when difficulties are encountered, for a case where the inventory update request includes multiple ones of the first virtual inventories, the multiple ones of the first virtual inventories in the updated first inventory information are reserved, so that the first user transfers rights to use the multiple ones of the first virtual inventories; and for a case where the inventory update request includes the self-owned available inventory of the first user and/or multiple ones of the second virtual inventories, second inventory information of the first user displayed on a page is updated by using the self-owned available inventory of the first user and/or the multiple ones of the second virtual inventories, and thanks to differentiated managements of the pieces of inventory information of different inventory types, inventories from different users/merchants and inventories provided to different users/merchants may be managed or processed in a differentiated manner, which allows a plurality of merchants to share inventories. Meanwhile, the inventory information can be processed more clearly and explicitly.

The above specific implementation modes do not form limitations on the scope of protection of the disclosure. It shall be understood by those skilled in the art that various modifications, combinations, sub-combinations and substitutions may occur depending on design requirements and other factors. Any modification, equivalent replacement, improvement, and so on made within the spirit and principle of the disclosure shall be included in the scope of protection of the disclosure.

The invention claimed is:

1. A method for processing inventory information, the method comprising:

receiving, with one or more processors, an inventory update request input by a first user, wherein the inventory update request includes: any multiple pieces of information among a self-owned available inventory of the first user, first virtual inventories provided by the first user to a plurality of second users, and second virtual inventories, which are provided by a plurality of third users, acquired by the first user;

updating, with the one or more processors, stored first inventory information of the first user by using the multiple pieces of information included in the inventory update request;

locking, with the one or more processors, if the inventory update request includes multiple ones of the first virtual inventories, the multiple ones of the first virtual inventories in the updated first inventory information, so that the first user transfers rights to use the multiple ones of the first virtual inventories;

updating, with the one or more processors, if the inventory update request includes the self-owned available inventory of the first user and/or multiple ones of the second virtual inventories, second inventory information of the first user displayed by a terminal device on a page by using the self-owned available inventory of the first user and/or the multiple ones of the second virtual inventories.

2. The method for processing inventory information of claim 1, the method further comprising:

determining, when the first user receives an order, an inventory type for an item included in the order; and decreasing inventories for the first inventory information and the second inventory information of the first user, respectively in accordance with the inventory type of the item and the item quantity included in the order.

3. The method for processing inventory information of claim 2, wherein the step of decreasing inventories for the first inventory information and the second inventory information of the first user comprises:

for a case where the inventory type of the item included in the order is the self-owned available inventory, decreasing the self-owned available inventory of the item in the first inventory information and the displayed inventory of the item in the second inventory information, respectively in accordance with the item quantity included in the order.

4. The method for processing inventory information of claim 2, wherein the step of decreasing inventories for the first inventory information and the second inventory information of the first user comprises:

for a case where the inventory type of the item included in the order is the second virtual inventory, determining at least one target second virtual inventory for the item;

performing an inventory update on the at least one target second virtual inventory.

5. The method for processing inventory information of claim 4, wherein the step of determining at least one target second virtual inventory for the item comprises:

determining, if the item corresponds to multiple ones of the second virtual inventories, the at least one target second virtual inventory from the multiple ones of the second virtual inventories in accordance with a preset virtual inventory priority policy.

6. The method for processing inventory information of claim 4, wherein the step of performing an inventory update on the at least one target second virtual inventory comprises:

generating an ownership adjustment sheet for the at least one target second virtual inventory;

sending the ownership adjustment sheet to a warehouse management system, so that the warehouse management system transfers the ownership of the item from the second user corresponding to the target second virtual inventory to the first user in accordance with the ownership adjustment sheet;

decreasing the at least one target second virtual inventory included in the first inventory information and the item quantity included in the second inventory information after receiving an indication of a successful ownership transfer sent by the warehouse management system.

7. The method for processing inventory information of claim 6, wherein after receiving an indication of a successful ownership transfer sent by the warehouse management system, the method further comprises:

increasing the self-owned available inventory included in the first inventory information.

8. The method for processing inventory information of claim 5, wherein after receiving an indication of a successful ownership transfer sent by the warehouse management system, the method further comprises:

generating a purchase order with respect to at least one second user for the first user in accordance with information on the ownership transfer processed by the warehouse management system, so that resources are exchanged between the first user and the second user based on the purchase order;

updating inventory information corresponding to the at least one second user in accordance with the purchase order with respect to the at least one second user.

9. The method for processing inventory information of claim 2, the method further comprising:

performing reverse conversions on the first inventory information and the second inventory information when receiving a return request for the item in the order.

10. The method for processing inventory information of claim 9, the method further comprising:

for a case where the item is from the second virtual inventory, sending an inventory reversal request to the warehouse management system, so that the warehouse management system reverses the ownership of the item;

performing the steps of performing reverse conversions on the first inventory information and the second inventory information when receiving an indication of a successful ownership reversal sent by the warehouse management system.

11. The method for processing inventory information of claim 10, wherein the step of performing a reverse conversion on the first inventory information comprises:

decreasing the self-owned available inventory of the item in the first inventory information.

12. The method for processing inventory information of claim 11, the method further comprising:

performing an increasing operation on the second virtual inventory corresponding to the item in the first inventory information of the first user.

13. The method for processing inventory information of claim 1, the method further comprising:

for a case where the first inventory information includes the first virtual inventory, updating the first virtual inventory included in the first inventory information when receiving an ownership adjustment result for the first virtual inventory sent by the warehouse management system.

14. An apparatus for processing inventory information, the apparatus comprising:

one or more processors configured to receive an inventory update request input by a first user, wherein the inventory update request includes: any multiple pieces of information among a self-owned available inventory of the first user, first virtual inventories provided by the first user to a plurality of second users, and second virtual inventories, which are provided by a plurality of third users, acquired by the first user; and update stored first inventory information of the first user by using the multiple pieces of information included in the inventory update request;

reserve, if the inventory update request includes multiple ones of the first virtual inventories, the multiple ones of the first virtual inventories in the updated first inventory information, so that the first user transfers rights to use the multiple ones of the first virtual inventories; and update, if the inventory update request includes the self-owned available inventory of the first user and/or multiple ones of the second virtual inventories, second inventory information of the first user displayed by a terminal device on a page by using the self-owned available inventory of the first user and/or the multiple ones of the second virtual inventories.

15. The apparatus for processing inventory information of claim 14, wherein the one or more processors are further configured to determine, when the first user receives an order, an inventory type for an item included in the order; and decrease inventories for the first inventory information and the second inventory information of the first user, respectively in accordance with the inventory type of the item and the item quantity included in the order.

16. An electronic device, comprising:

one or more processors;

a storage means for storing one or more programs, the one or more programs, when executed by the one or more processors, causing the one or more processors to implement the method of claim 1.

17. A computer-readable medium, on which a computer program is stored, the program, when executed by a processor, implementing the method of claim 1.

* * * * *